Dec. 23, 1941.  M. W. LUKES ET AL  2,266,883
ROPE SOCKET
Filed Oct. 14, 1938  2 Sheets—Sheet 2
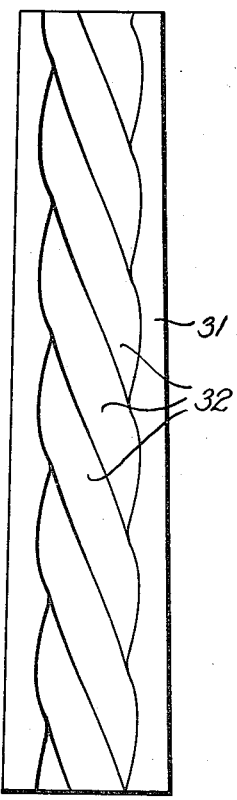
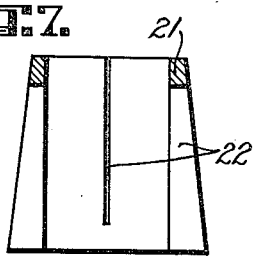
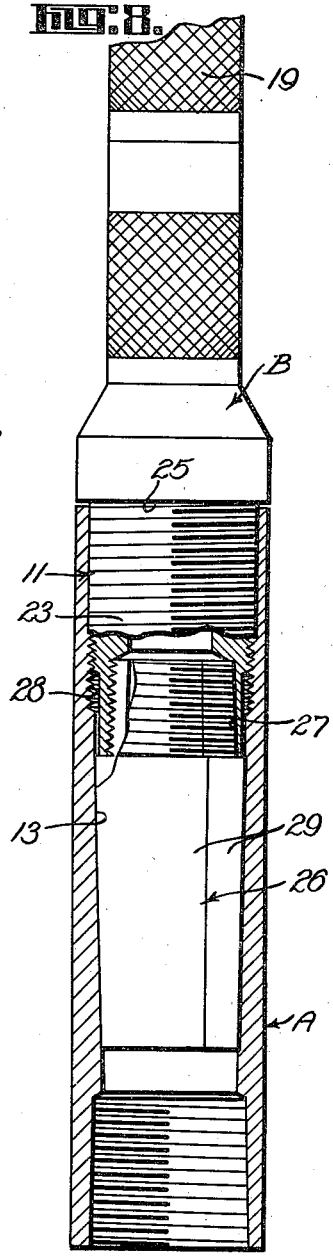
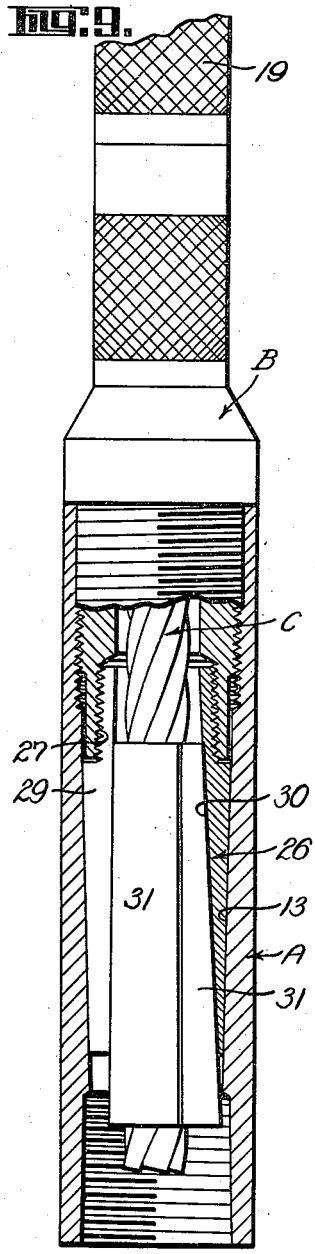
Inventors
MICHAEL W. LUKES
and
STANLEY G. DAVIES
By
Their Attorney Patented Dec. 23, 1941

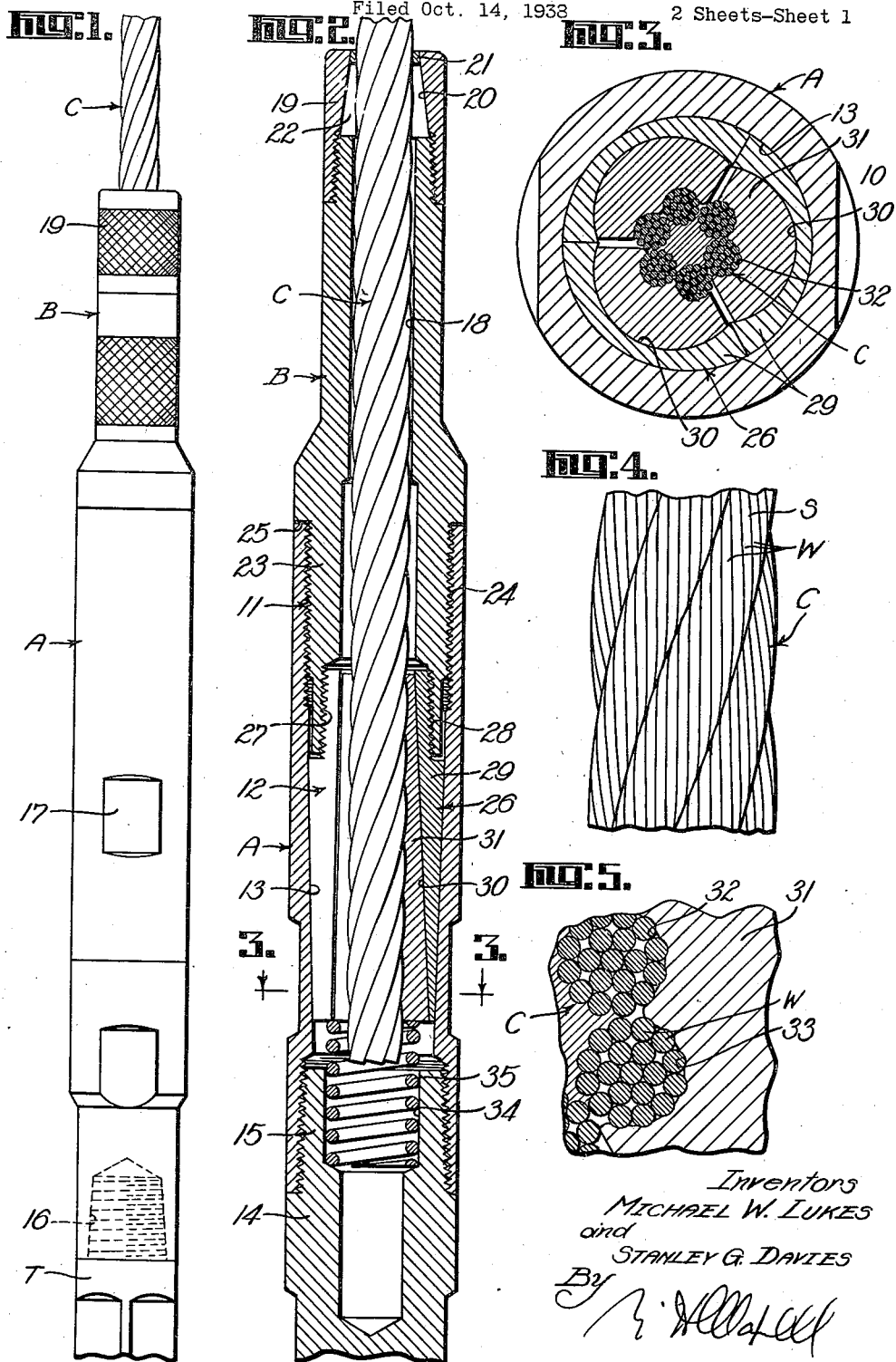

2,266,883

UNITED STATES PATENT OFFICE 2,266,883

ROPE SOCKET

Michael W. Lukes and Stanley G. Davies, Bakersfield, Calif.

Application October 14, 1938, Serial No. 234,950

5 Claims. (Cl. 287—75)

This invention relates to a connecting or coupling device and relates more particularly to a rope socket. A general object of this invention is to provide a simple, practical and dependable rope socket for connecting a cable or wire rope with a well tool or similar object.

The devices employed to connect wire rope or cable with well drilling tools, and the like, are known in the art as rope sockets. The rope sockets now in general use are provided with openings for receiving the end portions of the cable or rope. The end portions of the cable or rope are frayed and babbitt, or the like, is cast in the openings to secure the frayed cable or rope ends therein. Such typical rope sockets are not entirely dependable and the fraying of the cable and the pouring of the lead or babbitt are difficult, time consuming operations. Further, typical rope sockets are not releasable and the cable must be cut to disconnect it from the tool or object carrying the rope socket.

Another object of this invention is to provide a dependable rope socket that may be easily and quickly made up or applied.

Another object of this invention is to provide a rope socket that embodies a novel dependable wedge means for gripping the cable and does not require fraying of the cable or the pouring of babbitt or lead.

Another object of this invention is to provide a rope socket that may be easily and quickly released by merely breaking or unthreading a threaded connection. The improved rope socket of the present invention securely and dependably engages the cable when fully made up and yet may be easily and quickly released when it is desired to remove or disconnect the cable.

Another object of this invention is to provide a rope socket of the character mentioned embodying a novel combination of threaded connections and cable gripping means that effects the automatic conditioning of the gripping means when the socket sections are assembled and that frees the gripping means for immediate release when the threaded connection between the socket sections is broken or unthreaded.

Another object of this invention is to provide a rope socket embodying novel cable gripping elements shaped to conform to the strands of the cable and capable of limited distortion by the individual wires of the strands, so that they evenly and firmly grip the cable and yet do not tend to turn or thread along the cable when a heavy tension is applied to the cable.

A further object of this invention is to provide a rope socket of the character mentioned in which the cable gripping elements have extensive and even engagement with their actuating wedge surfaces to have even gripping contact with the cable.

The various objects and features of our invention will be fully understood from the following detailed description of a typical preferred form and application of the invention, throughout which description reference is made to the accompanying drawings, in which:

Fig. 1 is a side elevation of the improved rope socket provided by the present invention. Fig. 2 is an enlarged longitudinal detailed sectional view illustrating the principal parts of the rope socket in the assembled or active positions. Fig. 3 is an enlarged transverse detailed sectional view taken as indicated by line 3—3 on Fig. 2. Fig. 4 is an enlarged fragmentary side view of a typical wire rope or cable. Fig. 5 is an enlarged fragmentary transverse detailed sectional view illustrating the manner in which the gripping elements conform to the cable. Fig. 6 is an enlarged elevation of the inner side of one of the gripping elements. Fig. 7 is an enlarged longitudinal detailed sectional view of the vibration resisting cone, and Figs. 8 and 9 are central longitudinal detailed sectional views with certain parts in side elevation illustrating two steps in assembling the rope socket.

The rope socket of the present invention may be designed for use in connection with cables or wire rope of various characters. In the present disclosure we will describe a form of the invention for use with a stranded wire rope or cable of a type used in well drilling and well pumping operations. It is to be understood that the invention is not to be construed as limited or restricted to the particular form or application of the invention about to be described.

The cable C illustrated in the drawings includes six strands S, each made up of a plurality of twisted wire strands or wires W, and a core 10 within the series of strands S. The lay of the strands S is uniform and the lay of the wires W is different from the lay of the strands S. From an inspection of Fig. 4 of the drawings it will be seen that the individual wire strands or wires W are substantially vertical or longitudinal with respect to the longitudinal axis of the cable at the crests or outermost surfaces of the strands S. This disposition of the wires W results from the lay of the wires in the spiralled or helical strands S. The individual strands or wires W are steel and are subject to little or no distortion.

The improved rope socket of our present invention may be said to comprise, generally, two body sections A and B, a threaded connection 11 between the sections A and B and cable gripping means 12 conditioned for operation when the threaded connection 11 is made up and released or freed for release when the threaded connection 11 is broken or unthreaded.

The sections A and B constitute the principal body parts of the rope socket and contain or carry the various other parts of the device. The body section A is an elongate tubular member having a central longitudinal opening 13. The section A is adapted to be connected with a tool or other object. In the construction illustrated a sub or connecting member 14 serves to connect the body section A with a tool T or similar object. The connecting member 14 has a pin 15 threaded in the lower end of the tubular body section A and has a socket 16 in its lower end receiving a threaded pin on the tool T. The exterior of the body section A may be cylindrical except for a set or pair of flat faces 17 provided for engagement by a wrench or other turning tool.

The body section B is a tubular member having a central longitudinal opening 18. The opening 18 is adapted to pass the cable C with suitable clearance and, as illustrated, is smaller in diameter than the opening 13 of the section A. A head or cap 19 is threaded on the upper end portion of the section B. The cap 19 has a central longitudinal opening 20 whose wall slopes downwardly and outwardly. A tubular cone 21 is arranged in the opening 20 and is shaped and proportioned to conform to the wall of the opening. The lower end of the cone 21 rests on the upper end of the body section B. Longitudinally extending cuts or slits 22 enter the cone 21 from its opposite ends to make the cone compressible. When the cap 19 is threaded down the wall of its opening 20 cooperates with the cone 21 to compress the cone into tight engagement with the cable C. The cone 21 serves to prevent vibration and play of the cable C in the opening 18 and is not primarily intended to grip the cable C for the purpose of holding the same.

The threaded connection 11 between the two body sections A and B may be varied considerably without departing from the broader aspects of the invention. In the construction illustrated the connection 11 includes a pin 23 on the lower end of the body section B threaded in the upper end of the opening 13 in the section A. The threads 24 on the pin 23 and the wall of the opening 13 are preferably of substantial length. In the construction disclosed in the drawings it may be considered that the threads 24 are right hand threads. A shoulder 25 is provided on the section B at the upper end of the pin 23 and engages or opposes the upper end of the body section A.

The cable gripping means 12 is a feature of the invention. The means 12 is positive and dependable in preventing the detachment or disconnection of the cable C and yet is such that it may be released or freed for ready release by merely breaking or disconnecting the above described threaded connection 11. The cable gripping means 12 includes a tubular shell or cage 26 in the opening 13 of the body section A. The exterior of the cage 26 is adapted to have frictional or wedging cooperation with the wall of the opening 13 in the section A. In accordance with the invention the wall of the opening 13 slopes or tapers downwardly and inwardly and the exterior of the cage 26 is correspondingly tapered to have even cooperation with the wall of the tapered opening.

The shell or cage 26 is threadedly connected with the body section B. A socket 27 is provided in the lower end of the pin 23 and the upper portion of the cage 26 is reduced in diameter and is threaded in the socket 27. In accordance with the invention the threads 28 on the wall of the socket 27 and on the cage 26 have a pitch opposite to the pitch of the threads 24. Thus where the threads 24 are right hand threads, as above described, the threads 28 are left hand threads. The cage 26 is preferably sectional for a purpose which will hereinafter become evident. It is preferred to split or divide the cage 27 on radial longitudinal planes to comprise a plurality of segments or sections 29. In the application of the invention illustrated there are three like sections 29, the cage 26 being split or divided along three longitudinal planes.

The cage 26 is proportioned to surround the cable C with substantial clearance and the inner side of each cage section 29 has a longitudinal guide-way or groove 30. The grooves 30 of the several cage sections 29 are alike. The grooves 30 slope downwardly and outwardly relative to the central longitudinal axis of the device. In the preferred construction the walls of the grooves 30 are cylindrically curved, being curved about downwardly and outwardly inclined axes. It is to be understood that the curvature of the walls of the grooves 30 is uniform throughout the lengths of the grooves, that is, the wall of each groove 30 has a single radius of curvature. The inclination of the grooves 30 and the radius of curvature of the walls of the grooves are such that the upper ends of the three grooves 30 may define a substantially cylindrical and complete opening at the upper end of the cage 26. The guideways or grooves 30 preferably extend throughout the length of the cage 26.

The cable gripping means 12 further includes gripping elements 31 for engaging or gripping the cable C. There is a set or series of similar elements 31 arranged in the cage 26 to surround and grip the cable C. The gripping elements 31 are received in or cooperate with the grooves 30, there being one gripping element 31 cooperating with each groove 30. The gripping elements 31 are elongate members and in practice may be of substantially the same length as the cage 26. The outer sides of the elements 31 are cylindrically curved to conform to and evenly bear in the grooves 30 of the cage sections 29. The inner sides of the gripping elements 31 are shaped to conform to the cable C. In accordance with the invention the inner sides of the gripping elements 31 are concave and have series of helically pitched grooves 32 for receiving the strands S of the cable C. The grooves 32 have the same lay or pitch as the strands S. It is preferred to cast the grooves 32 in the gripping elements 31 to give the walls of the grooves a desirable roughness, although the grooves may be formed in other manners, if desired.

It is a feature of the invention that the gripping elements 31 are formed of a material sufficiently hard to resist excessive distortion and failure and yet capable of deformation by the individual strands or wires W of the cable C when the elements 31 are in tight engagement with the cable. It has been found practical to form the gripping elements 31 of tough bronze, or the like. As pointed out above, the wires W are substantially parallel and are longitudinally disposed to the crests of the strands S and the co-operation of the longitudinally disposed wires W with the walls of the grooves 32 prevents turning and threading of the gripping elements along the cable C. When a tension of substantial magnitude is put on the cable C the wires W are depressed or embedded in the walls of the grooves 32 and form indentations or sub-grooves 33. This depression or indentation of the wires W in the walls of the grooves 32 is best illustrated in Fig. 5 of the drawings. The embedding of the substantially parallel and longitudinal wires W in the walls of the helical grooves 32 effectively resists relative turning and threading between the gripping elements 31 and the cable C.

The cable gripping means 12 further includes spring means for actuating or for assisting in the actuation of the gripping elements 31. A socket 34 is provided in the pin 15 of the connecting member 14 and a helical compression spring 35 is seated in the socket 34. The spring 35 extends upwardly beyond the upper end of the pin 15 to engage the lower ends of the gripping elements 31. The spring 35 urges the elements 31 upwardly in the tapered or inclined grooves 30 to assist in setting or actuating the gripping elements.

In making up or assembling the rope socket of the present invention the wedge-like sections 29 of the cage 26 are assembled to form the cage 26 and the upper portion of the cage is threaded in the socket 27. It is preferred to thread the cage 26 in the socket 27 by hand. The body section A is then passed over the cage 26 and threaded on the pin 23 of the section B. During the threading of the section A on the pin 23 the tapered wall of the opening 13 comes in contact with the tapered external surface of the cage 26 and as the upper end of the section A approaches the shoulder 25 the frictional engagement between the wall of the opening 13 and the cage 26 results in turning of the cage with the section A. The right hand rotation of the cage 26 with the section A results in loosening and backing off of the threads 28, the threads 28 being left hand threads. Thus the cage 26 is backed down a certain extent when the threaded connection 11 is made up. The cable C may then be threaded through the opening 18 to have its end adjacent or beyond the lower end of the cage 26. The cap 19 and the cone 22 may be free or loose when the cable is threaded into the body section B. The gripping elements 31 are then assembled and passed upwardly in the cage 26 around the cable C. Fig. 9 of the drawings illustrates the gripping elements 31 being arranged in the cage 26. It is to be understood that the gripping elements 31 are arranged in their respective grooves 30 to have correct engagement with the cable C. The gripping elements 31 may be pushed into the grooves 30 by hand to have some gripping engagement with the cable C.

The connecting member 14 carrying the spring 35 is then assembled on the lower end of the section A by threading the pin 15 in the lower end of the opening 13. When this is done the upper end of the spring 35 engages the lower ends of the gripping elements 31 and as the spring is compressed by the threading of the pin 15 in the opening 13 the gripping elements 31 are urged upwardly in the inclined grooves 30. This of course brings the gripping elements 31 into tighter gripping engagement with the cable C. It may be found desirable to apply or maintain a certain tensile strain on the cable C when the gripping elements 31 are forced into gripping contact with the cable by the compressed spring 35. When the pin 15 has been fully threaded in the lower end of the opening 13 the spring 35 exerts a substantial upward force on the gripping elements 31 and the elements obtain a firm engagement with the cable C. A tensile strain is then put on the cable C and the rope socket assembly and the contact of the elements 31 with the cable urges or feeds the gripping elements along the inclined grooves 30 until the gripping elements have a very secure hold on the cable C.

The wedging of the gripping elements 31 against the cable C by the movement of the gripping elements in the inclined grooves 30 results in the formation of the depressions or sub-grooves 33 in the walls of the helical grooves 32. As pointed out above, the engagement of the substantially parallel crest portions of the wires W with the walls of the grooves 32 during and subsequent to the formation of the depressions or grooves 33 prevents backing down or threading of the elements 31 along the cable C. Following the final setting of the gripping elements 31 by the application of the tensile strain the rope socket is in condition for use.

When it becomes desirable or necessary to release the rope socket the body section A is unthreaded from the section B, that is, the threaded connection 11 is broken or unthreaded. The section A is slid off of the cage 26 or removed from the cage. The removal of the section A is accompanied by disengagement of the spring 35 from the lower ends of the gripping elements 31. During the breaking or unthreading of the connection 11 the frictional contact of the cage 26 with the wall of the opening 13 causes the cage to turn with the section A. Owing to the fact that the threads 28 are left hand threads and the threads 24 are right hand threads, rotation of the cage 26 with the section A during unthreading of the section A results in tightening or threading down of the threads 28. In other words the cage 26 is threaded upwardly in the socket 27 while the section A is threaded downwardly from the section B. The taper on the wall of the opening 13 and the exterior of the cage 29 is opposite in direction to the inclination of the grooves 30 and the exteriors of the gripping elements 31 and when the section A is removed, as just described, the sections 29 of the cage 26 free themselves from the gripping elements 31. The upward threading of the cage 26 merely threads the cage to the position where it was threaded by hand when the device was assembled and the cage may be easily unthreaded by hand or by means of a suitable tool, and the cage and elements 31 may be easily removed from the cable C. The cable C may then be withdrawn from the opening 18.

It is to be observed that the slips 31 of the rope socket firmly and dependably grip the cable C to positively prevent detachment of disconnection of the cable when the same is under tension. The rope socket may be easily and quickly released by merely breaking or unthreading the threaded connection 11, which operation is accompanied by the automatic freeing of the cage 26 and the freeing of the gripping elements 31.

Having described only a typical preferred form and application of our invention, we do not wish to be limited or restricted to the specific details herein set forth, but wish to reserve to ourselves any variations or modifications that may appear to those skilled in the art or fall within the scope of the following claims.

Having described our invention, we claim:

1. A coupling device for a cable comprising two sections adapted to receive the cable, a threaded connection between the sections, means in the sections for gripping the cable including a cage frictionally bearing in one section, and cable gripping elements held active by the cage, and a threaded connection between the cage and the other section, the threads of said connections being pitched in opposite directions whereby the making up of the first named connection conditions the cage to hold the elements active and the unthreading of said first named connection frees the cage to release the elements.

2. A coupling device for a cable comprising two sections adapted to receive the cable, a threaded connection between the sections, means in the sections for gripping the cable including elements for gripping the cable, a wedge member frictionally bearing in one section and confining the gripping elements about the cable, and a threaded connection between the wedge member and the other section having threads pitched in the opposite direction to the threads of the first named connection whereby rotation of the wedge member with the first named section during unthreading of the first named connection retracts the wedge member and frees the gripping elements.

3. In a coupling device for a cable, a body section having an opening receiving the cable, a removable cage bearing in the opening and divided longitudinally into sections, each section having an inclined guideway in its inner side, said guideways having cylindrically curved walls, and gripping elements for gripping the cable and having cylindrically curved rear sides slidably bearing in the guideways.

4. A rope socket for a cable comprising two tubular sections for receiving the cable, a releasable threaded connection between the sections, an inclined wall on the interior of one section, a cage in said section having an inclined surface cooperating with the surface of said section, the cage being longitudinally divided into sections, each cage section having a groove in its inner side inclined in the opposite direction to said surfaces and having a cylindrically curved wall, gripping elements having their outer sides conforming to and shiftable in the grooves and having their inner sides shaped to conform to and grip the cable, and threads connecting the cage with the other section and pitched in the opposite direction to the threads of said threaded connection whereby the frictional engagement of said surfaces causes the cage to thread back and release the gripping elements when the said threaded connection is unthreaded.

5. A coupling device for a cable comprising two sections adapted to receive the cable, a threaded connection between the sections, means in the sections for gripping the cable including a part frictionally bearing in one section, said section having a tapered socket, a split cone bearing in said socket and engaging about the cable to dampen vibration, and a threaded connection between said part and the other section, the threads of said threaded connections being pitched in opposite directions whereby unthreading of the first named connection threads said part to release said means.

MICHAEL W. LUKES.
STANLEY G. DAVIES.